Jan. 25, 1938.  A. J. KELLY  2,106,530
CONVERTIBLE COASTER WAGON AND SLED
Filed March 15, 1937   4 Sheets-Sheet 1
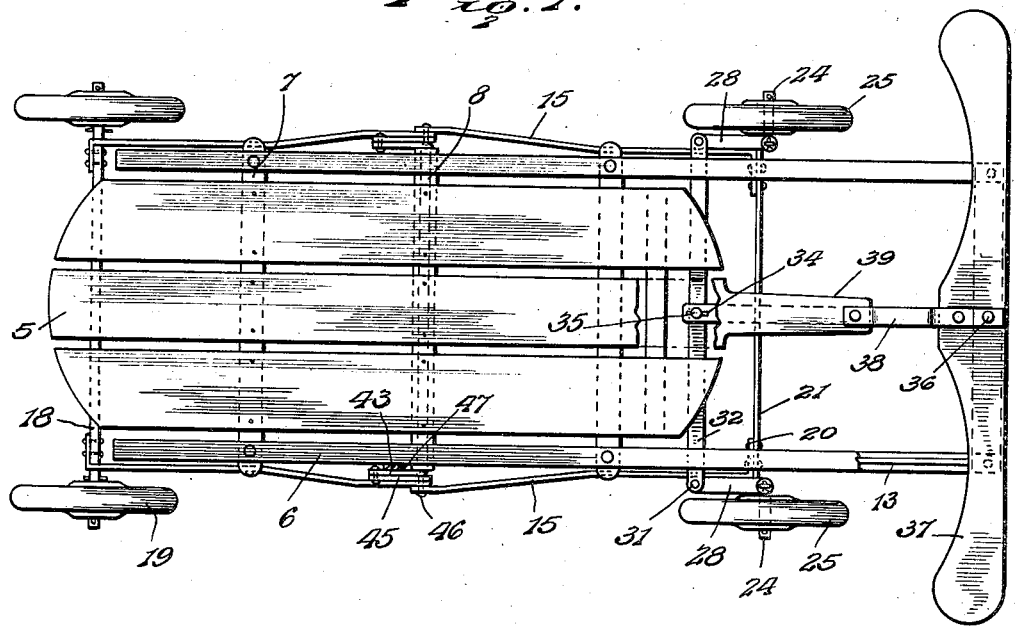
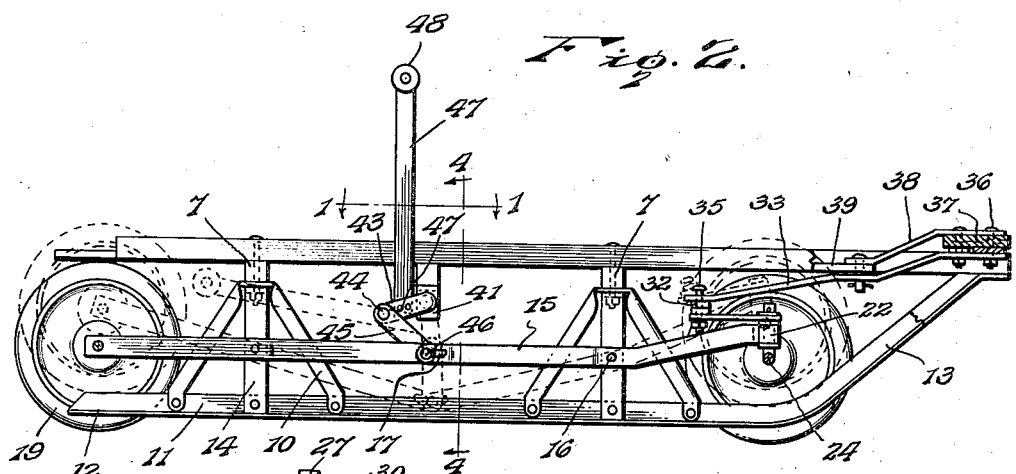
Inventor
A. J. Kelly.
By Lacey & Lacey,
Attorneys

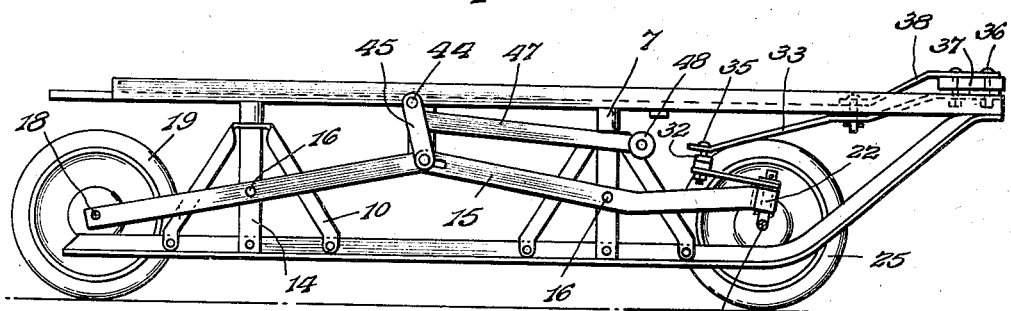

Jan. 25, 1938.  A. J. KELLY  2,106,530
CONVERTIBLE COASTER WAGON AND SLED
Filed March 15, 1937  4 Sheets-Sheet 3
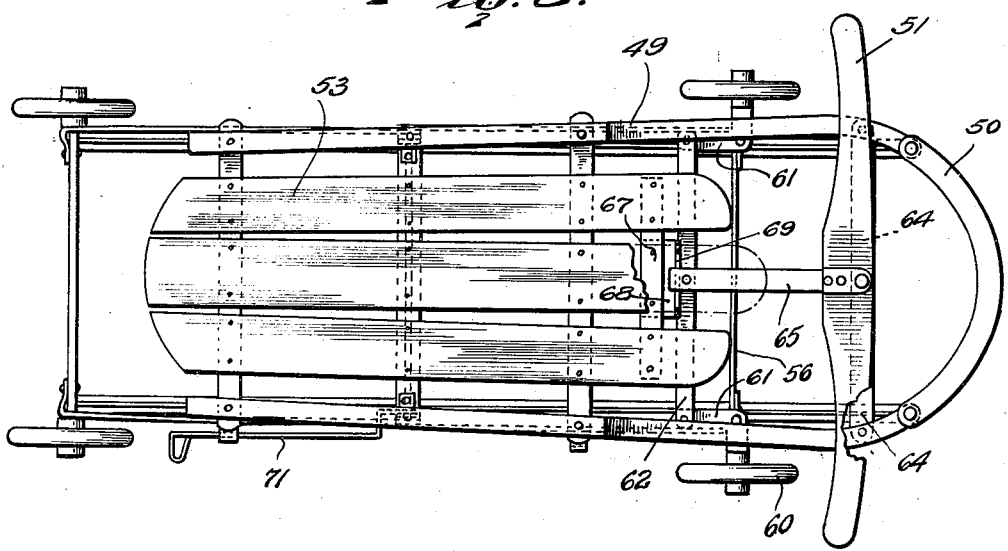
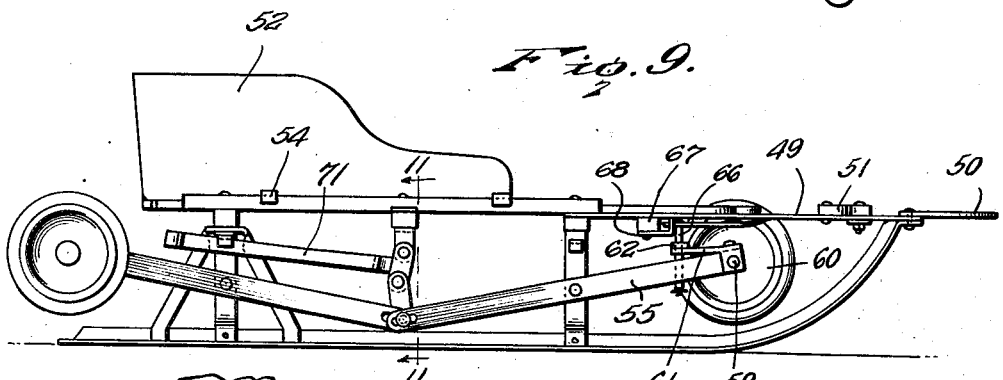
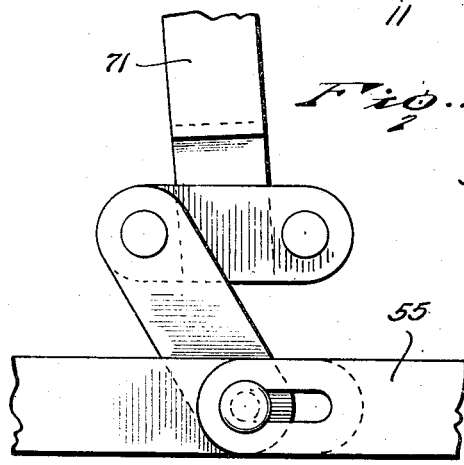
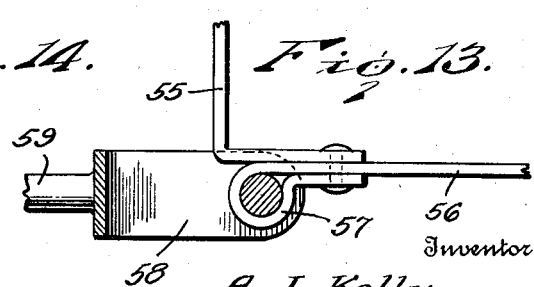
Inventor
A. J. Kelly.
By Lacey & Lacey
Attorneys Jan. 25, 1938.  A. J. KELLY  2,106,530
CONVERTIBLE COASTER WAGON AND SLED
Filed March 15, 1937   4 Sheets-Sheet 4
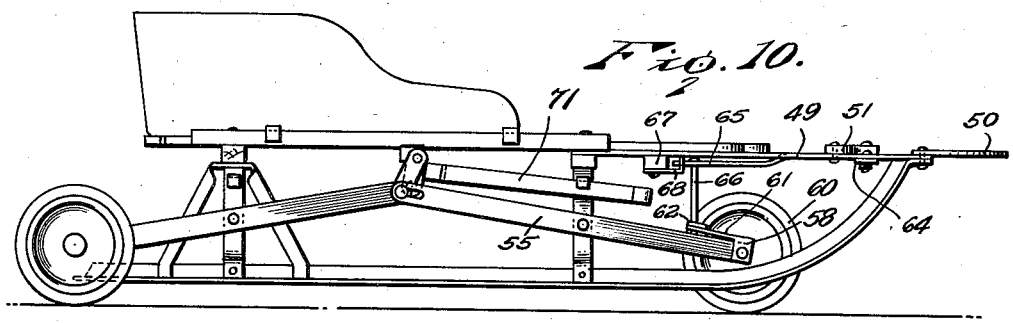
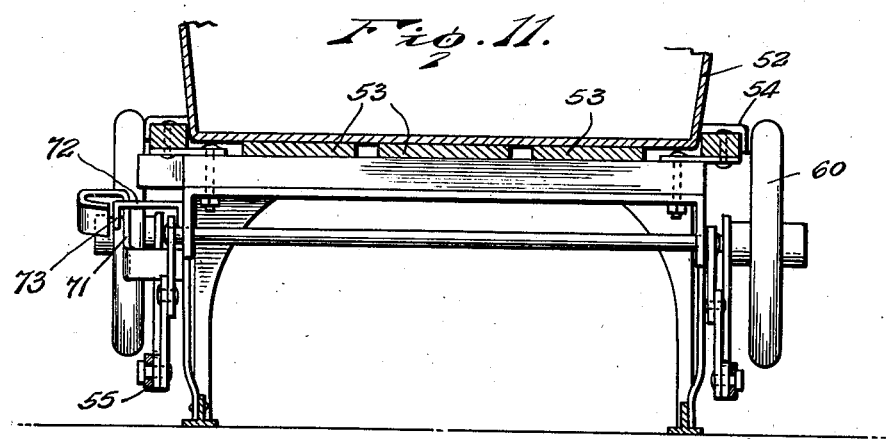
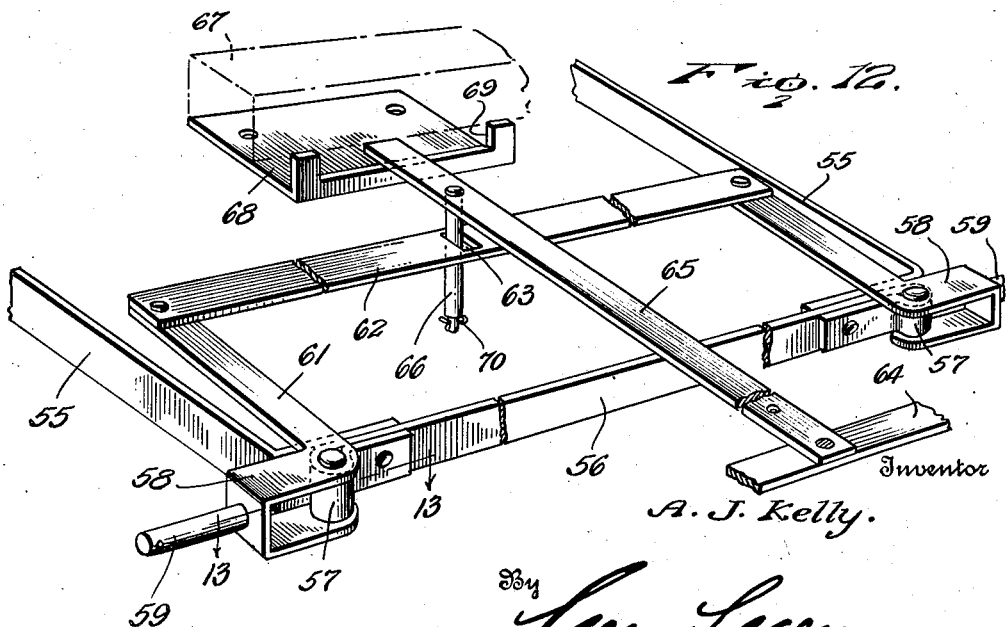

Patented Jan. 25, 1938

2,106,530

UNITED STATES PATENT OFFICE 2,106,530

CONVERTIBLE COASTER WAGON AND SLED

Andrew J. Kelly, Richmond, Va.

Application March 15, 1937, Serial No. 131,025

11 Claims. (Cl. 280—9)

This invention relates to convertible coaster wagons and sleds of that general type shown and described in U. S. Letters Patent issued to me on the 27th day of December, 1927, under Number 1,654,465, the present invention being an improvement thereon.

The object of the invention is generally to improve and simplify the construction of the device whereby to increase its efficiency and reduce the cost of manufacture.

A further object of the invention is to provide a convertible wagon and sled, the traction wheels of which are raised and lowered by means of a rock shaft connected through the medium of links with rocking side bars whereby movement of the rock shaft will cause the links to act directly upon the side bars and tilt the same to permit either the sled runners or wheels to contact with the ground.

A still further object of the invention is to provide a resilient operating handle rigidly connected with one of the crank arms of the rock shaft and adapted to yieldably engage a suitable keeper on the sled body for holding the traction wheels in either a raised or lowered position.

A further object of the invention is to provide the forward end of the sled with a guard or bumper and the rear end thereof with a seat detachably mounted on the platform of the sled.

Further objects and advantages will appear in the following description and specifically pointed out in the claims.

In the accompanying drawings forming a part of the specification,

Figure 1 is a top plan view of a convertible wagon and sled embodying the present invention, Figure 2 is a side elevation showing the operating lever in neutral position and in dotted lines the traction wheels in elevated position so as to permit the use of the device as a sled, Figure 3 is a similer view showing the traction wheels in lowered position to permit the use of the device as a wagon, Figure 4 is a transverse sectional view taken on the line 4—4 of Figure 2, Figure 5 is a detail plan view on an enlarged scale showing the manner of mounting the front wheels, Figure 6 is a similar view showing how the front axle is formed to support the pivoted knuckles of the front wheels, Figure 7 is an enlarged sectional view taken on the line 7—7 of Figure 5, Figure 8 is a top plan view of a convertible wagon and sled illustrating a modified form of the invention, the detachable seat being removed for sake of clearness, Figure 9 is a side elevation showing the sled runners in contact with the ground and the detachable seat in position on the platform, Figure 10 is a similar view showing the sled runners elevated and the traction wheels engaging the ground, Figure 11 is a transverse sectional view taken on the line 11—11 of Figure 9, Figure 12 is a detail perspective view of the steering gear detached, Figure 13 is a detail sectional view taken on the line 13—13 of Figure 12, and Figure 14 is an enlarged side elevation of the connecting links.

The convertible wagon and sled forming the subject-matter of the present invention comprises a platform including longitudinal boards 5, side rails 6 and cross sills 7 and 8 to which said boards 5 are secured. Disposed beneath the platform are knees or bolsters preferably formed of pressed steel and secured to the under sides of the cross sills 7, each bolster comprising a pair of downwardly diverging legs 10 secured at their lower ends to the upstanding flanges 11 of runners, indicated at 12. The forward ends of the runners are curved upwardly, at 13, and are secured to the under sides of the side rails 6, as best shown in Figure 2 of the drawings. The bolsters further include uprights 14 which are located between the diverging legs 10 and are secured at their lower ends to the flanges 11 of the runners. Disposed on opposite sides of the sled are rocking bars 15 pivotally mounted at 16 on the uprights 14, said bars having their inner ends overlapped and one of said bars being provided with a longitudinally disposed slot 17. Connecting the ends of the rear rocking bars 15 is an axle 18 upon which are mounted traction wheels 19, the latter being preferably provided with rubber tires, as shown. The forward ends of the front rocking bars 15 are bent inwardly to form attaching arms 20 which are riveted or otherwise rigidly secured to a front axle 21. The front axle 21 is preferably formed of a single strip of flat metal, the ends of which are bent or coiled into cylindrical shape to form vertically disposed bearings 22 in which are journaled the upstanding pins 23 of stub shafts 24. Mounted for rotation on the stub shafts 24 are forward traction wheels 25, said wheels being free to move laterally with the pins 23 so as to facilitate guiding the device when used as a wagon. The upper ends of the pins 23 are reduced to form shoulders 26 defining angular extensions 27 and fitting over said extensions 27 are links 28 interposed between washers 29 and held against displacement by cotter pins 30. The links 28 are pivotally connected at 31 with a radius rod 32 and connected with the central portion of said radius rod is a bar 33 having a slot 34 to accomodate a pivot pin 35. The forward end of the bar 33 is connected, at 36, with a transverse cross piece or handle 37 which, in turn, is connected with the side rails 6, as best shown in Figure 3 of the drawings. A strap iron 38 forms a connection between the central portion of the handle 37 and an extension 39 of the central board 5 of the sled body.

Bolted or otherwise rigidly secured to the lower surface of the intermediate cross sill 8 are brackets 40 having depending extensions 41 provided with openings in which is journaled a transverse rock shaft 42. The rock shaft 42 extends entirely across the body of the sled beneath the cross sill 8 and the opposite ends of said rock shaft are provided with terminal cranks 43 preferably integral therewith, as shown. Pivotally connected, at 44, with the adjacent crank arms 43 are links 45 provided with laterally extending pins 46, which pins fit within the slots 17 and serve to connect the overlapping ends of the rocking side bars 15 so that, when the shaft 42 is actuated, the links 45 will either depress or elevate the rocking side bars 15 to correspondingly raise or lower the traction wheels. Rigidly secured to the crank arm 43 on one side of the sled, is an operating lever 47 preferably formed of spring metal and having its upper end provided with a lateral knob or finger piece 48, said arm being adapted to be swung to either the front or rear of said body to effect raising or lowering of the traction wheels. As before stated, the operating lever 47 is preferably formed of resilient material so that, when said lever is swung either towards the front or rear of the sled body, it will snap beneath the end of the adjacent cross sill 7 or beneath a suitable keeper and thus lock the parts in adjusted position. In order to release the lever, it is merely necessary to spring said lever laterally until it clears the projecting end of the cross sill 7 when the lever may be moved to the desired position.

Figure 2 of the drawings shows the lever in upright or neutral position. When it is desired to convert the wagon into a sled, the operating handle 47 is moved rearwardly until said lever snaps beneath the end of the adjacent sill 7. As the lever 47 is swung rearwardly and downwardly, the crank arms 43 will actuate the links 45 to exert a downward pressure on the overlapping ends of the rocking side bars 15, thus elevating the traction wheels to the dotted-line position shown in Figure 2 of the drawings and causing the runners 12 to contact with the ground. When it is desired to convert the sled into a wagon, it is merely necessary to swing the free end of the lever 47 forwardly and downwardly until said lever snaps beneath the end of the forward cross sill 7. As the lever 47 is swung forwardly and downwardly, the links 45 will elevate the overlapping ends of the rocking side bars 15 and thus lower the traction wheels into contact with the ground so that the device may be used as a wagon. It will here be noted that, when the links 45 are in either an elevated or depressed position, the pivot pins 44 and 46 will be substantially in alinement so as to form, in effect, a lock and in which position they will be held by engagement of the operating lever with the end of the adjacent cross sill 7 so that the parts are effectually held in adjusted position when the device is used either as a wagon or sled. By exerting pressure on the ends of the handle bar 37, the forward traction wheels 25 may be tilted to guide the wagon and likewise when the device is used as a sled this movement of the handle bar will deflect the runners to permit guiding of the device.

In Figures 8 to 14 inclusive of the drawings, there is illustrated a modified form of the invention in which the front bolsters or knees are dispensed with so as to render the runners of the sled more flexible. In this form of the device, the body of the sled is streamline in contour with the side sills 49 thereof diverging forwardly and connected at their front ends by a curved bar or plate 50 constituting a bumper so as to prevent injury to the hands of a child operating the stearing handle 51 in case the sled should strike a tree or other obstruction. In certain embodiments of the invention, it is preferred to detachably mount a seat on the platform of the sled to accommodate babies and small children, and in Figures 9 to 11 inclusive of the drawings a seat 52 of conventional construction is shown mounted on the rear portion of the platform 53. The seat 52 may be secured to the platform in any suitable manner, but it is preferred to employ spring clips 54 which detachably engage the side rails of the sled, as shown. The front ends of the forward rocking bars 55 are connected by a transverse brace 56 formed with terminal tubular members 57 which constitute bearings for knuckle joints 58. The knuckle joints 58 are provided with stub shafts 59 on which the front wheels 60 are journaled and formed integral with said knuckle joints are rearward extensions 61 connected by a radius bar 62 having a vertical slot 63 formed centrally therein, as shown. The forward ends of the side sills 49 at the rear of the bumper 50 are united by a transverse brace 64 on which the steering handle 51 is pivotally mounted and secured to said steering handle and pivotally mounted for turning movement on the brace 64 is the adjacent end of a longitudinal steering bar 65, the other end of which is provided with a depending pin 66 which extends through the slot 63 and serves to actuate the radius rod 62 and steer the front wheels when the latter are in lowered position. Extending across the boards constituting the platform 53 at the front end thereof is a transverse cleat 67 and secured to said cleat is a plate 68 having a slot 69 formed therein and which serves to receive and guide the inner end of the steering bar 65. The lower end of the pin 66 is provided with a terminal cotter pin 70 which serves to prevent the pin from sliding out of the slot 63 when the front wheels are in lowered position.

In this form of the invention, the operating lever 71 instead of springing beneath the ends of the bolster, as illustrated in Figure 1 of the drawings, said operating lever springs beneath lateral clips or keepers 72 arranged directly beneath the adjacent bolsters, as best shown in Figure 11 of the drawings. The outer ends of the clips 72 are provided with depending lips 73 to assist in preventing displacement of the adjacent end of the lever after being sprung within or beneath the clip.

It will thus be seen that, when the traction wheels are in elevated position and the sled runners in contact with the ground, by exerting lateral pressure on either end of the steering handle 51, the inner end of the steering bar 65 will contact with the adjacent end wall of the slot 69 and thus deflect the forward ends of the runners so as to permit the user to guide the sled. When the traction wheels are in lowered position to form a wagon, movement of the steering handle 51 through the medium of the steering bar 65, radius bar 62 and plate 68 will tilt the front wheels laterally and permit steering of the wagon, as will be readily understood.

It will, of course, be understood that the devices may be made in different sizes and shapes and constructed of any suitable material without departing from the spirit of the invention.

Having thus described the invention, what is claimed as new is:

1. In a convertible coaster wagon and sled, a body structure, runners for supporting said structure, a rock shaft extending transversely of the structure and provided with terminal crank arms, rocking bars disposed at opposite sides of the structure and having their inner ends overlapped and pivotally connected, traction wheels carried by the rocking side bars, links depending from the crank arms and pivotally connected with the overlapping ends of the rocking side bars, and an operating handle connected with one of said crank arms.

2. In a convertible coaster wagon and sled, a platform, runners for supporting the platform, bearings secured beneath the platform, a rock shaft journaled in said bearings and provided with terminal crank arms, rocking bars disposed on opposite sides of the platform and having their inner ends overlapped and pivotally connected, traction wheels carried by the outer ends of the rocking side bars, relatively short links disposed on opposite sides of the sled and forming a pivotal connection between the crank arms and the overlapped inner ends of the adjacent rocking side bars, lever-engaging members disposed on one side of the sled, and an operating lever connected with one of the crank arms and adapted to engage said members for holding the parts in adjusted position.

3. In a convertible coaster wagon and sled, a platform including intermediate and end cross sills, bearings secured to the intermediate sill, a rock shaft journaled in said bearings and provided with terminal crank arms, rocking bars pivotally mounted on opposite sides of the platform and having their inner ends overlapped and pivotally connected, traction wheels carried by the outer ends of the rocking side bars, runners depending from the platform, links depending from the crank arms and pivotally connected with the overlapped ends of the rocking side bars, spaced lever-engaging members disposed on one side of the sled, and a resilient operating lever rigidly connected with one of the crank arms and adapted to yieldably engage the adjacent lever-engaging member for holding the parts in adjusted position.

4. A convertible coaster wagon and sled including a platform having cross sills, bolsters depending from the cross sills, runners secured to the bolsters, a crank shaft journaled beneath one of the cross sills and provided with terminal crank arms, rocking bars pivotally mounted on the bolsters at opposite sides of the platform and having their inner ends pivotally connected, there being a slot formed in the inner end of one of the rocking bars on each side of the platform, links depending from the crank arms and pivotally connected with the inner ends of the rocking side bars, an operating lever connected with one of the crank arms, and a keeper engaging the operating lever for holding the parts in adjusted position.

5. In a convertible coaster wagon and sled, a platform, bolsters depending from the platform, runners carried by the bolsters, bearings disposed beneath the platform, a rock shaft journaled in said bearings and provided with terminal crank arms, rocking bars pivotally mounted on the bolsters at opposite sides of the platform and having their inner ends overlapped, one of the bars on each side being provided with a slot, pins extending through the overlapped ends of the bars and said slots, links depending from the crank arms and pivotally connected with said pins, a lever rigidly secured to one of the crank arms, and spaced keepers adapted to alternately engage the free end of said lever for locking the rocking side bars in adjusted position.

6. A convertible coaster wagon and sled comprising a platform having transverse sills, bolsters secured to said sills, runners carried by the bolsters, rocking bars pivotally mounted on the bolsters at opposite sides of the platform and having their inner ends overlapped and provided with a pin and slot connection, traction wheels secured to the ends of the rear bars, the forward ends of the forward bars being bent laterally to form angular attaching brackets, a transverse shaft secured to said attaching brackets and provided with tubular bearings, knuckle pins fitted in said bearings and provided with stub shafts, forward traction wheels mounted on the stub shafts, a radius bar, links forming connection between the radius bar and knuckle pins, a rock shaft disposed beneath the platform and provided with crank arms, links forming a pivotal connection between the crank arms and pin and slot connection of the rocking side bars, and an operating lever rigidly secured to one of the crank arms.

7. A convertible coaster wagon and sled comprising a body portion having runners, rocking bars pivotally mounted on the opposite sides of the body portion and having their inner ends overlapped and provided with a pin and slot connection, traction wheels carried by the outer ends of said rocking bars, a transverse rock shaft journaled on the body portion and provided with terminal crank arms, relatively short links depending from the crank arms and operatively connected with the pin and slot connection of the adjacent rocking side bars, and an operating lever connected with the rock shaft.

8. A convertible coaster wagon and sled comprising a body portion having runners, rocking bars pivotally mounted at opposite sides of the body portion and having their inner ends overlapped and provided with a pin and slot connection, traction wheels carried by the outer ends of the rocking side bars, a rock shaft extending transversely of the body portion and provided with terminal crank arms, relatively short links forming a pivotal connection between the crank arms and the inner overlapping ends of the rocking side bars, means operatively connected with one of the crank arms for raising and lowering the links to tilt the rocking side bars and raise and lower the traction wheels, the pivotal connection between the links and crank arms and the pivotal connection between the links and overlapping ends of the rocking side bars being disposed substantially in alinement when said links are in both raised and lowered positions.

9. In a convertible coaster wagon and sled, a body structure, runners for supporting said structure, a rock shaft extending transversely of the structure and provided with terminal crank arms, rocking bars disposed at opposite sides of the structure and having their inner ends overlapped and pivotally connected, traction wheels carried by the rocking side bars, depending links carried by the crank arms and pivotally connected with the overlapping ends of the rocking side bars, spaced keepers disposed on one side of the body structure, and an operating handle connected with one of said crank arms and adapted to engage the adjacent keeper.

10. In a convertible coaster wagon and sled, a body structure including side bars, a transverse bar connecting the side bars, an operating handle pivotally mounted on said transverse bar, runners for supporting said structure, a rock shaft extending transversely of the structure and provided with crank arms, rocking bars disposed at opposite sides of the structure and having their inner ends overlapped and pivotally connected, forward and rearward sets of traction wheels carried by the rocking bars, a radius bar connecting the forward set of traction wheels, links forming a connection between the crank arms and overlapping ends of the rocking side bars, a slotted plate secured to the structure, a steering bar pivotally connected with the transverse bar and having its rear end operating within the slot of said plate, a pin depending from the steering bar and operatively connected with the radius bar, and an operating lever connected with one of said crank arms.

11. In a convertible coaster wagon and sled, a body structure, runners for supporting said structure, a rock shaft extending transversely of the structure and provided with crank arms, rocking bars disposed at opposite sides of the structure and having their inner ends overlapped and pivotally connected, rear traction wheels carried by the rear rocking bars, a transverse bar connecting the forward rocking bars and provided with tubular members constituting bearings, knuckles pivotally mounted in said bearings and provided with stub shafts, front traction wheels journaled on the stub shafts, a radius bar connected with the inner ends of the knuckle joints, a handle bar, a connection between the handle bar and radius bar for steering the front traction wheels, an operating lever connected with one of said crank arms, and keepers secured to the body structure and adapted to engage the operating lever.

ANDREW J. KELLY.